United States Patent
Yang et al.

(10) Patent No.: US 11,893,749 B1
(45) Date of Patent: Feb. 6, 2024

(54) FOCUS FOLLOWING METHOD BASED ON MOTION GRAVITY CENTER, STORAGE MEDIUM AND PHOTOGRAPHING SYSTEM

(71) Applicant: Chengdu Tommi Technology Co., Ltd., Chengdu (CN)

(72) Inventors: Shiliang Yang, Chengdu (CN); Shiming Dai, Chengdu (CN); Guohao Gao, Chengdu (CN)

(73) Assignee: Chengdu Tommi Technology Co., Ltd., Chengdu (CN)

( * ) Notice: Subject to any disclaimer, the term of this patent is extended or adjusted under 35 U.S.C. 154(b) by 0 days.

(21) Appl. No.: 18/231,810

(22) Filed: Aug. 9, 2023

(30) Foreign Application Priority Data

Oct. 17, 2022 (CN) .......................... 202211267405.2

(51) Int. Cl.
  *G06T 7/20* (2017.01)
  *G06T 7/50* (2017.01)
  *G06T 7/11* (2017.01)

(52) U.S. Cl.
  CPC ................ *G06T 7/20* (2013.01); *G06T 7/11* (2017.01); *G06T 7/50* (2017.01); *G06T 2207/30241* (2013.01)

(58) Field of Classification Search
  CPC ..... G06T 7/11; G06T 7/20; G06T 7/50; G06T 2207/30241
  See application file for complete search history.

(56) References Cited

U.S. PATENT DOCUMENTS 5,625,577 A * 4/1997 Kunii .................. G06T 7/20
  703/2
11,297,247 B1 * 4/2022 James ................. H04N 23/90
2013/0265483 A1 10/2013 Tamaki
(Continued)

FOREIGN PATENT DOCUMENTS

CN  102547244 A  7/2012
CN  103679171 A  3/2014
(Continued)

OTHER PUBLICATIONS

Wang Jian-Ping, et al., Research and design of detecting and tracking system for mobile robot, Journal of Zhejiang University (Engineering Science), 2007, pp. 1710-1714, vol. 41 No. 10.

Primary Examiner — Katrina R Fujita
(74) Attorney, Agent, or Firm — Bayramoglu Law Offices LLC

(57) ABSTRACT

A focus following method based on a motion gravity center, a storage medium and a photographing system are provided. The focus following method includes the following steps: S1, acquiring video data captured by a camera within an initial time period; S2, acquiring video data with only a living object within the initial time period; S3, acquiring a motion gravity center image from the video data with only the living object according to a motion gravity center library; and S4, calculating an initial motion direction and an initial motion speed of the motion gravity center image within the initial time period. According to the present disclosure, the calculation amount is greatly reduced, the complex data is simplified, focus following based on the motion gravity center under poor hardware conditions can be can achieved, and requirements of low-cost and mass-production hardware can be satisfied.

20 Claims, 4 Drawing Sheets

(56) References Cited

U.S. PATENT DOCUMENTS

2015/0310656 A1\* 10/2015 Otto ................ G06V 40/23
                                                                        345/420
2020/0193608 A1\* 6/2020 Sato ................ G06V 20/46

FOREIGN PATENT DOCUMENTS

| CN | 107045623 | A |   | 8/2017  |
|----|-----------|---|---|---------|
| CN | 107993256 | A |   | 5/2018  |
| CN | 115334249 | A |   | 11/2022 |
| CN | 115345901 | A | \* | 11/2022 |
| CN | 115348392 | A | \* | 11/2022 |
| CN | 115457666 | A | \* | 12/2022 |
| JP | 2008217690 | A |   | 9/2008  |

\* cited by examiner

FOCUS FOLLOWING METHOD BASED ON MOTION GRAVITY CENTER, STORAGE MEDIUM AND PHOTOGRAPHING SYSTEM

CROSS REFERENCE TO THE RELATED APPLICATIONS

This application is based upon and claims priority to Chinese Patent Application No. 202211267405.2, filed on Oct. 17, 2022, the entire contents of which are incorporated herein by reference.

TECHNICAL FIELD

The present disclosure belongs to the technical field of pet photographing, and relates to a focus following technique of moving object photographing, and in particular to a focus following method based on a motion gravity center, a storage medium and a photographing system.

BACKGROUND

One of key techniques of photography is to accurately focus on a target to be photographed. If the target is moving, the moving target needs to be kept in a followed state in a photographing process, that is, focus following. With regard to photographing of a moving object, usually a higher requirement is raised for a photographer's focus following level. Based on this requirement, the auto focus following technique is developed and applied in a lot of scenarios.

For focus following photographing of the moving object, two methods are usually employed. One is to perform target identification and extraction on an image acquired by a camera, and to calculate a position of an object to perform feedback-type focus following adjustment; and the other one is to perform active adjustment control on a target with a specific trajectory according to a preset trajectory.

However, when the methods are applied to living objects such as animals and pets, the solution for performing feedback-type focus following adjustment by means of target extraction and identification has the following defects:

(1) The feedback-type focus following adjustment requires that a photographing system has strong image identification operational capability and focusing response speed, but the requirement is difficult to be satisfied when the movement speed of the object is high or the focus following requirement is high.

(2) When living bodies such as animals and pets are used as targets, forms of the living bodies are non-fixed (different postures of the animals, such as squatting, standing, running, jumping, and scaling have large difference when being used as picture objects), and have the characteristics of multiple change types and high change speed, which brings great difficulty to a target identification process.

SUMMARY

In order to solve the existing technical problems, the present disclosure provides a focus following method based on a motion gravity center, a storage medium and a photographing system.

To achieve the above objective, the present disclosure employs the following technical solution:

A focus following method based on a motion gravity center is provided and includes the following steps:

S1, acquiring video data captured by a camera within an initial time period;

S2, acquiring video data with only a living object within the initial time period;

S3, acquiring a motion gravity center image from the video data with only the living object according to a motion gravity center library;

S4, calculating an initial motion direction and an initial motion speed of the motion gravity center image within the initial time period;

S5, calculating a motion trajectory of the living object according to the data in S4; and S6, calculating a corresponding function relationship between the motion trajectory of the living object and focus following.

Preferably, S3 includes the following substeps:

S31, establishing a motion gravity center library;

S32, acquiring original data about the living object leaving the ground and only being stressed, where the original data has video data and image data;

S33, acquiring a reference video image with only the living object from the original data;

S34, acquiring a relative speed of a local body of the living object at a first moment from the reference video image;

S35, fitting the relative speed of the local body at the first moment in a horizontal direction, and calculating an average speed of the living object in the horizontal direction;

S36, acquiring a two-dimensional image block same as the average speed from the reference video image, where coordinates where the two-dimensional image block is located are coordinates of the motion gravity center image; and S37, storing the two-dimensional image block into the motion gravity center library.

Preferably, the average speed of the living object in the horizontal direction is $$V = F(v1, v2, \ldots, vm) \quad (1),$$

where the local body has a head, eyes, forepaws, and hind paws, v1, v2, vm represent speeds of various portions of the local body respectively at the first moment in the horizontal direction, m is an integer greater than 1, and F ( ) represents a fitting function of the average speed.

Preferably, in S3, each frame of image in the video data with only the living object is divided into a motion gravity center area and a non-motion gravity center area, and the motion gravity center image is acquired from the motion gravity center area according to the motion gravity center library.

The motion gravity center area has a back image and an abdomen image of the living object, and the non-motion gravity center area has a head image, a leg image and a tail image of the living object.

Preferably, each frame of image in the video data with only the living object is divided into a nine-grid area of 3*3, and the motion gravity center area is located in the second column and the second row of the nine-grid area.

Preferably, in S4, the initial motion direction has a plane moving direction and a depth moving direction.

The plane moving direction is a motion direction of the living object on a photographed two-dimensional image, and the depth moving direction is a motion direction of the living object in a direction perpendicular to a photographed two-dimensional plane.

Preferably, the initial motion speed has a plane moving speed and a depth moving speed.

The plane moving speed is a motion speed of the living object on the photographed two-dimensional image, and the depth moving speed is a motion speed of the living object in a direction perpendicular to the photographed two-dimensional plane.

The initial motion speed is the sum speed of the plane moving speed and the depth moving speed.

Preferably, a direction of the depth moving speed of the living object is calculated by calculating a change proportion of a size of the motion gravity center image within the initial time period.

If the size of the motion gravity center image becomes larger within the initial time period, it is indicated that the living object moves in a direction close to the camera.

If the size of the motion gravity center image within the initial time period is unchanged, it is indicated that a distance between the living object and the camera is unchanged.

If the size of the motion gravity center image becomes smaller within the initial time period, it is indicated that the living object moves in a direction away from the camera.

Preferably,
a direction of the depth moving speed of the living object is calculated by calculating change in a shape of a hair spot in the motion gravity center image within the initial time period.

Preferably, in S6,
a direction of the camera is adjusted when a distance from the coordinates of the motion gravity center image of the living object to a wide side of the photographed two-dimensional image is <D/7, and D is a length of a long side of the photographed two-dimensional image.

When a distance from the coordinates of the motion gravity center image of the living object to the long side of the photographed two-dimensional image is <F/7, directionality of the camera is adjusted, F is a length of the wide side of the photographed two-dimensional image, and the length of the long side is not lower than the length of the wide side.

A readable storage medium includes
an executable program, where the executable program can execute the focus following method based on a motion gravity center.

A photographing system based on a motion gravity center includes
an imaging module,
a storage module, and
a processing module, where
the imaging module is configured to acquire image information,
the storage module is configured to store the image information and an executable program, and
the processing module can execute the focus following method based on a motion gravity center when operating the executable program.

The present disclosure has the beneficial effects are as follows: The focus following method based on motion gravity center, the storage medium and the photographing system are provided. According to the focus following method based on a motion gravity center of the present disclosure, the calculation amount is greatly reduced. Moreover, in the present disclosure, the complex data is simplified to solve the motion gravity center of the living object, focus following based on the motion gravity center under poor hardware conditions can be achieved, and requirements of low-cost and mass-production hardware can be satisfied.

DETAILED DESCRIPTION OF THE EMBODIMENTS

Figure 1:
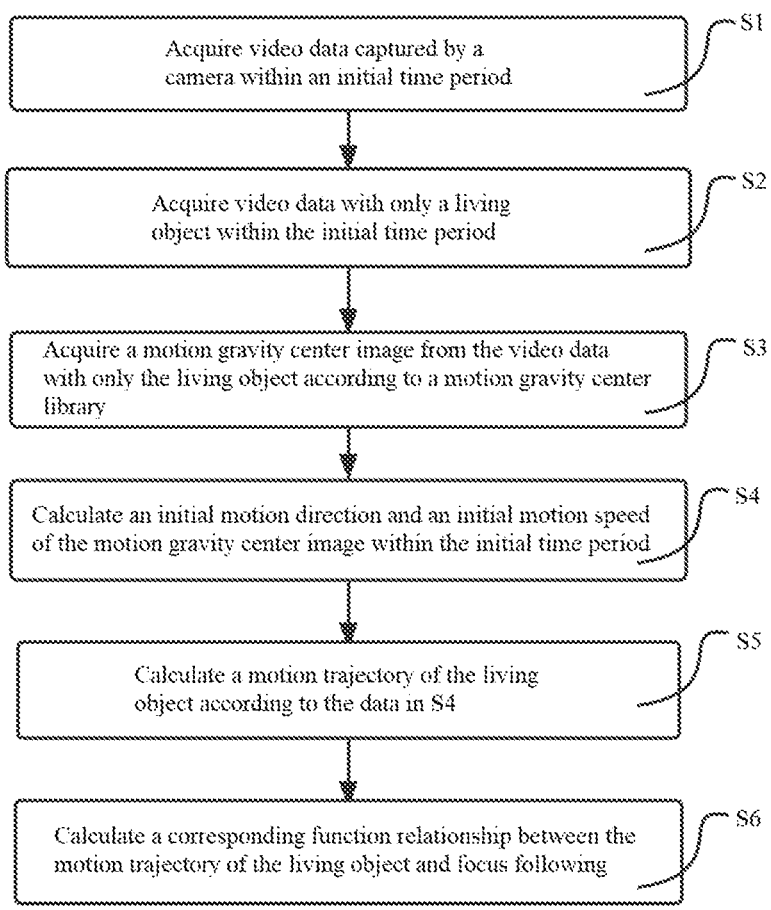
FIG. 1 is a flow chart of a focus following method based on a motion gravity center.

The technical solutions in the examples of the present disclosure will be clearly and completely described below with reference to the accompanying drawings in the examples of the present disclosure. Obviously, the described examples are merely some examples rather than all examples of the present disclosure. All the other examples obtained by those of ordinary skill in the art based on the examples in the present disclosure without creative efforts shall fall within the scope of protection of the present disclosure.

With reference to FIGS. 1-6, the particular examples of the present disclosure are as follows:

Example 1

A focus following method based on a motion gravity center includes the following steps:
S1, acquire video data captured by a camera within an initial time period;
S2, acquire video data with only a living object within the initial time period;
S3, acquire a motion gravity center image from the video data with only the living object according to a motion gravity center library;
S4, calculate an initial motion direction and an initial motion speed of the motion gravity center image within the initial time period;
S5, calculate a motion trajectory of the living object according to the data in S4; and
S6, calculate a corresponding function relationship between the motion trajectory of the living object and focus following.

With continuous development of the Internet, a large number of pet enthusiasts share their own pet information, including videos, pictures, language characters, etc. A propagation speed of information by means of short videos is very high, a propagation range is also very wide, and the pet information has already gradually occupied most of the content of the short videos. In particular, a user who nourishes a pet more wishes to watch videos, pictures, etc. of the pet of the user, and therefore, providing a device for photographing a domestic pet is quite meaningful.

When a camera mounted at home is used for shooting, a problem of automatic focus following is often encountered. When a moving object is photographed, in order to ensure the definition of the photographed object, the moving object needs to be focused in time. In the prior art, focus following is divided into two manners, namely manual focus following and automatic focus following. A photographer of a master level performs arbitrary focusing according to a moving object, such that a good photographing effect can be achieved, but the number of photographers of the master level is limited, and the cost of such a method is too high.

One automatic focus following manner belongs to feedback-type focus following. For the feedback-type focus following, firstly a moving object needs to be identified, then a distance between the moving object and a lens is determined, and finally a focusing action is performed in the method, the camera is required to have strong operational capability to achieve complex image processing work, which is a great challenge for video data processing with higher real-time requirement. Moreover, for the method, focusing of a high-speed moving living object is more difficult to achieve. For another automatic focus following manner, focusing is performed under a fixed motion trajectory, and focusing may be preset according to a known motion trajectory to achieve an effect of automatic focusing. However, the premise of accurate focusing of the method is to know the motion trajectory in advance, a living object such as a pet does irregular motion, and the motion trajectory fails to be known in advance, such that the method fails to accurately focus the living object, and a clear motion video of the living object is difficult to be photographed.

When the living object moves quickly (the living object is a living thing such as a domestic pet and an animal), there is a great probability that a local body moves. For example, the head of the pet does not move while the body moves, or the body of the pet does not move while the head moves, under such similar situations, a camera automatically adjusts a focal length, but due to the fact that the motion of the pet is not regular, there is a great probability that the focus length adjusted by means of the camera is be too large, resulting in occurrence of a jitter phenomenon of the photographed video, which is difficult to accept. Moreover, an image picture is blurred, such that the quality of overall original data is heavily influenced, and an experience feeling of the user is extremely poor.

In this example, as shown in FIG. 1, a focus following method based on a motion gravity center is provided and includes the following steps: S1, acquire video data captured by a camera within an initial time period; S2, acquire video data with only a living object within the initial time period; S3, acquire a motion gravity center image from the video data with only the living object according to a motion gravity center library; S4, calculate an initial motion direction and an initial motion speed of the motion gravity center image within the initial time period; S5, calculate a motion trajectory of the living object according to the data in S4; and S6, calculate a corresponding function relationship between the motion trajectory of the living object and focus following. The present disclosure provides the focus following method based on a motion gravity center, a small segment of video data of a living object during jumping, an initial motion direction and an initial motion speed within the time period is calculated by means of a motion gravity center image, and a motion trajectory of the living object is calculated according to the calculated initial motion direction and the initial motion speed, such that focusing is performed according to the calculated motion trajectory, and the motion trajectory and focusing are in a one-to-one correspondence relationship. According to the present disclosure, real-time focus following of the living object is achieved, and clear image data can be photographed.

Example 2

S3 includes the following substeps:

S31, establish a motion gravity center library;

S32, acquire original data about the living object leaving the ground and only being stressed, where the original data has video data and image data;

S33, acquire a reference video image with only the living object from the original data;

S34: acquire a relative speed of a local body of the living object at a first moment from the reference video image;

S35, fit the relative speed of the local body at the first moment in a horizontal direction, and calculate an average speed of the living object in the horizontal direction;

S36, acquire a two-dimensional image block same as the average speed from the reference video image, where coordinates where the two-dimensional image block is located are coordinates of the motion gravity center image; and S37, store the two-dimensional image block into the motion gravity center library.

When a living object such as a pet (such as a cat/dog) moves, the object is taken as an overall object, the motion manner is single, especially when the object moves in a jumping manner, the object is only subjected to gravity, and at the moment, no matter how a posture of the object changes, the gravity center follows a simple motion manner of single stress. Therefore, if the unique gravity center of the object is identified and accurately acquired, gravity center coordinates are applied to focus following motion photographing of the object, which is one of the key techniques for the quality of a motion film photographed about the object, and particularly, focus following photographing with accurate pre-judgment of a trajectory can be achieved of jumping and other ground-off motion behaviors.

Figure 2:
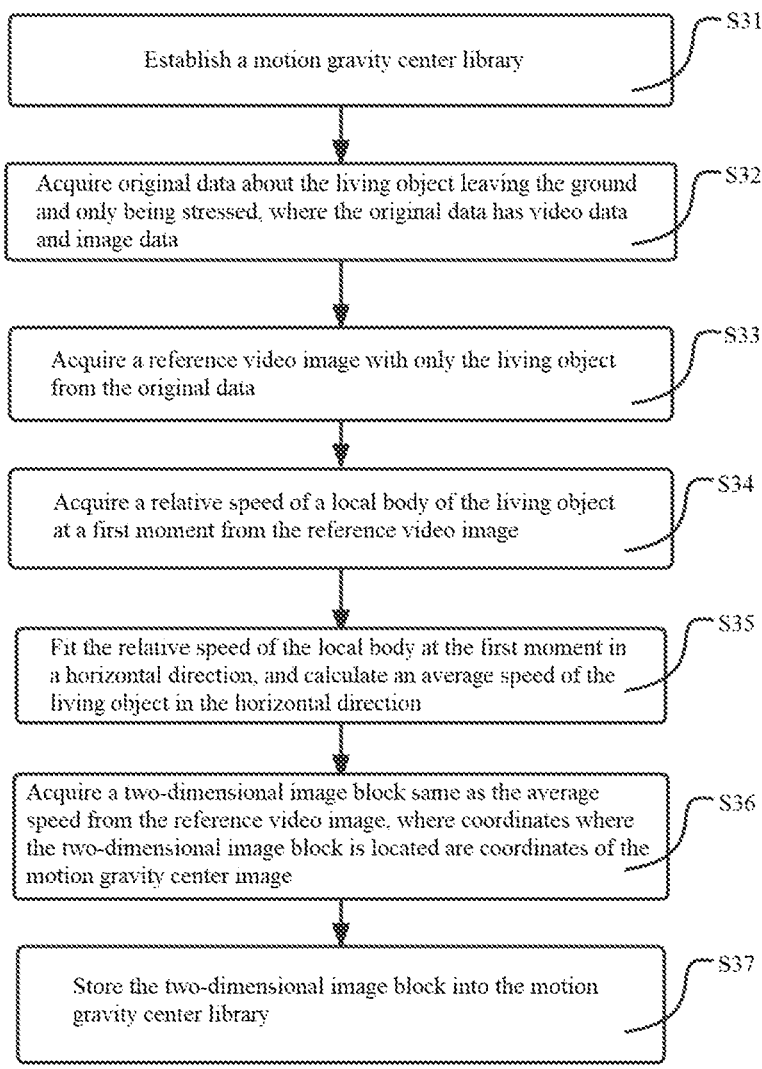
FIG. 2 is a flow chart for establishing a motion gravity center library.

In this example, as shown in FIG. 2, S3 includes the following substeps: S31, establish a motion gravity center library; S32, acquire original data about the living object leaving the ground and only being stressed, where the original data has video data and image data; S33, acquire a reference video image with only the living object from the original data; S34: acquire a relative speed of a local body of the living object at a first moment from the reference video image; S35, fit the relative speed of the local body at the first moment in a horizontal direction, and calculate an average speed of the living object in the horizontal direction; and S36, acquire a two-dimensional image block same as the average speed from the reference video image, where coordinates where the two-dimensional image block is located are coordinates of the motion gravity center image.

Since the number of pets at home of the user is limited, generally 1-2, and pet objects are relatively fixed, a motion gravity center image of the living object is learned and stored, then the object is tracked and photographed, and the motion gravity center of the living object is calculated from a daily motion trajectory of the living object.

At different moments and under different states, a position of the actual motion gravity center of the living object is changed due to different postures and body types of the living object. In the present disclosure, the motion gravity center images of the pet in the user's home in various states are stored by constructing the motion gravity center library.

Compared with the feedback-type focus following, the motion trajectory calculated through the focus following method based on a motion gravity center of the present disclosure is close to an actual motion trajectory of the living object, pictures photographed by the camera according to the focus following method based on a motion gravity center of the present disclosure are clear without blurring, jitter and other situations. According to the present disclosure, the calculation amount is greatly reduced. Moreover, in the present disclosure, the complex data is simplified to calculate the motion gravity center, close to an actual gravity center position, of the living object, identification of the motion gravity center close to the actual gravity center position under poor hardware conditions can be achieved, and requirements of low-cost and mass-production hardware can be satisfied.

Example 3

The average speed of the living object in the horizontal direction is $$V=F(v1,v2,\ldots,vm) \quad (1),$$

where the local body has a head, eyes, forepaws, and hind paws, v1, v2, vm represent speeds of various portions of the local body respectively at the first moment in the horizontal direction, m is an integer greater than 1, and F ( ) represents a fitting function of the average speed.

When the living object jumps away from the ground, the object is only subjected to gravity, the gravity center of the object is unique, and the unique motion gravity center trajectory of the object may be calculated according to the unique motion trajectory of the object, such that a focal length to be adjusted of the camera is determined, and a picture jitter phenomenon can be avoided. As the living object is not stressed in a horizontal direction, the momentum of the object is conserved in the horizontal direction.

In this example, an average speed of the living object in the horizontal direction is calculated by calculating a relative speed of a local body in the horizontal direction at a first moment for fitting, the average speed V of the living object in the horizontal direction is fitted through a fitting function according to the momentum conservation in the horizontal direction, and the average speed V of the living object in the horizontal direction is the speed of the gravity center of the living body in the horizontal direction. In an example, the living object is a cat, v1 represents a horizontal speed of forepaws of the cat at a certain moment, v2 represents a horizontal speed of hind paws of the cat at a certain moment, and v3 represents a horizontal speed of the head of the cat at a certain moment.

Example 4

In S3,
each frame of image in the video data with only the living object is divided into a motion gravity center area and a non-motion gravity center area, and
the motion gravity center image is acquired from the motion gravity center area according to the motion gravity center library.

The motion gravity center area has a back image and an abdomen image of the living object, and the non-motion gravity center area has a head image, a leg image and a tail image of the living object.

Each frame of image in the video data with only the living object is divided into a nine-grid area of 3*3, and the motion gravity center area is located in the second column and the second row of the nine-grid area.

Due to various varieties of domestic pets, most of the pet appearance hair has similarity, for example, stripes of Dragon-Li are not easy to identify, and false detection is likely to occur when the motion gravity center is identified, resulting in focus following failure.

Figure 3:
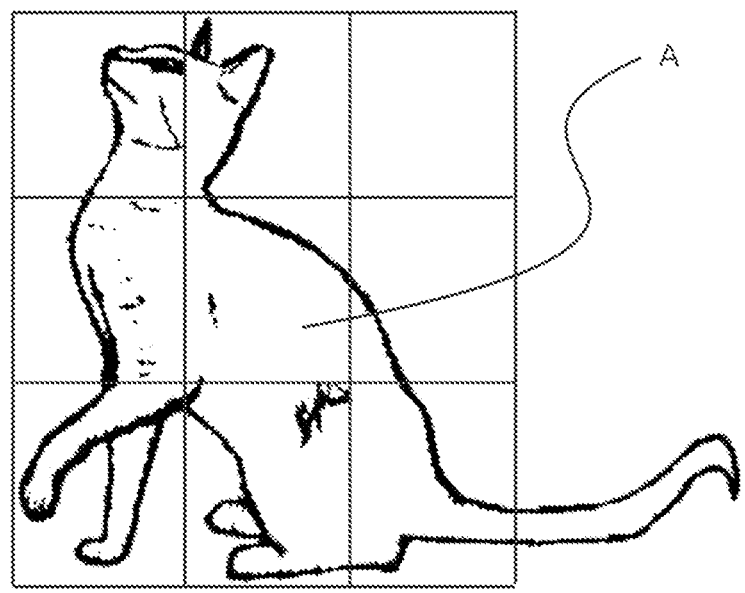
FIG. 3 is a schematic diagram of a living object.

In this example, as shown in FIG. 3, each frame of image in the video data with only the living object is divided into the motion gravity center area and the non-motion gravity center area, and the motion gravity center image is acquired from the motion gravity center area according to the motion gravity center library, where the motion gravity center area has the back image and the abdomen image of the living object, and the non-motion gravity center area has the head image, the leg image and the tail image of the living object. Preferably, each frame of image in the video data with only the living object is divided into the nine-grid area of 3*3, and the motion gravity center area is located in the second column and the second row A of the nine-grid area. According to the present disclosure, the video data with only the living object is subjected to area division, and then the motion gravity center image is acquired from the motion gravity center area, such that a false detection rate of the motion gravity center is greatly reduced, clear image data can be photographed through the present disclosure, and the real-time focus following of the living object is achieved.

Example 5

In S4,
the initial motion direction has a plane moving direction and a depth moving direction.

The plane moving direction is a motion direction of the living object on a photographed two-dimensional image, and the depth moving direction is a motion direction of the living object in a direction perpendicular to a photographed two-dimensional plane.

The initial motion speed has a plane moving speed and a depth moving speed, where
the plane moving speed is a motion speed of the living object on the photographed two-dimensional image, and the depth moving speed is a motion speed of the living object in a direction perpendicular to the photographed two-dimensional plane.

The initial motion speed is the sum speed of the plane moving speed and the depth moving speed.

Since the image photographed by the camera is a two-dimensional picture, the plane moving direction can be directly acquired from the image, but the depth moving direction of the living object fails to be directly acquired. Adjustment of a focal length during focus following is determined according to a distance between the living object and the camera, such that providing a method for monitoring a distance between a living object and a camera in real time is very valuable.

In this example, in S4, the initial motion direction has the plane moving direction and the depth moving direction, where the plane moving direction is the motion direction of the living object on the photographed two-dimensional image, and the depth moving direction is the motion direction of the living object in the direction perpendicular to the photographed two-dimensional plane. The initial motion speed has the plane moving speed and the depth moving speed, where the plane moving speed is the motion speed of the living object on the photographed two-dimensional image, the depth moving speed is the motion speed of the living object in the direction perpendicular to the photographed two-dimensional plane, and the initial motion speed is the sum speed of the plane moving speed and the depth moving speed. The motion trajectory of the living object is calculated according to the initial motion direction and the initial motion speed, the initial motion speed is the sum speed of the plane moving speed and the depth moving speed, and the motion trajectory of the living object is determined by combining the plane moving speed and the depth moving speed. According to the present disclosure, the picture photographed by means of focus following according to the calculated motion trajectory is clear, and the living object is always kept on a focal plane.

Example 6

A direction of the depth moving speed of the living object is calculated by calculating a change proportion of a size of the motion gravity center image within the initial time period.

If the size of the motion gravity center image becomes larger within the initial time period, it is indicated that the living object moves in a direction close to the camera.

If the size of the motion gravity center image within the initial time period is unchanged, it is indicated that a distance between the living object and the camera is unchanged.

If the size of the motion gravity center image becomes smaller within the initial time period, it is indicated that the living object moves in a direction away from the camera.

In this example, since a distance between the living object and the camera is unfixed, sizes of the living object photographed at the same posture and at the same viewing angle are different, and according to the imaging principle, the present disclosure calculates the direction of the depth moving speed of the living object by calculating the change proportion of the size of the motion gravity center image within the initial time period. Moreover, if the size of the motion gravity center image becomes larger within the initial time period, it is indicated that the living object moves in a direction close to the camera; if the size of the motion gravity center image within the initial time period is unchanged, it is indicated that a distance between the living object and the camera is unchanged; and if the size of the motion gravity center image becomes smaller within the initial time period, it is indicated that the living object moves in a direction away from the camera. The motion direction of the living object in a depth direction is determined, and the motion speed of the living object in the depth direction is calculated according to the change proportion of the size of the motion gravity center image within the initial time period, such that the initial motion speed of the living object is calculated.

Example 7

A direction of the depth moving speed of the living object is calculated by calculating change in a shape of a hair spot in the motion gravity center image within the initial time period.

Figure 4A:
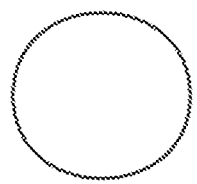
FIGS. 4A-4F are schematic diagrams of a motion gravity center image.
Figure 4B:
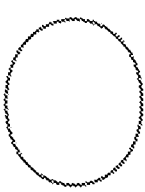
Figure 4C:
Figure 4D:
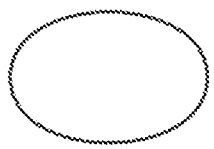
Figure 4E:
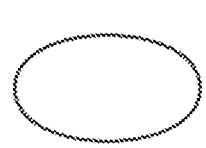
Figure 4F:
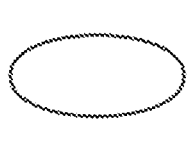

Since the living object is in motion, its posture is varied. When the living object is photographed from different angles, the same hair spot presents different characteristics on the two-dimensional image. As shown in FIGS. 4A-4F, FIG. 4A represents a shape of a spot when the living object is photographed in a face-to-face manner, FIG. 4B and FIG. 4C represent shapes of a photographed spot after the living object moves in the horizontal direction and the depth direction, and FIG. 4D, FIG. 4E and FIG. 4F represent shapes of a photographed spot after the living object moves in a vertical direction and the depth direction. For example, a black round spot is photographed in the face-to-face manner, and when the motion direction of the living object is changed, the black round spot photographed may become oval. Moreover, different long axes of the ovals correspond to different motion directions. In this example, the direction of the depth moving speed of the living object is calculated by calculating the change in the shape of the hair spot in the motion gravity center image within the initial time period, thereby calculating the initial motion speed of the living object.

Example 8

In S6,
a direction of the camera is adjusted when a distance from the coordinates of the motion gravity center image of the living object to a wide side of the photographed two-dimensional image is <D/7, D is a length of a long side of the photographed two-dimensional image.

When a distance from the coordinates of the motion gravity center image of the living object to the long side of the photographed two-dimensional image is <F/7, directionality of the camera is adjusted, F is a length of the wide side of the photographed two-dimensional image, and the length of the long side is not lower than the length of the wide side.

Since the magnification of an edge portion and a center portion of a lens is different, distortion is caused. The distortion generally appears at an edge of a picture, and the distortion may change an imaging shape of the object, thereby affecting the accurate acquisition of the motion gravity center image of the living object, and there is a great probability to cause focus following failure. Moreover, when the living object is at the edge of the photographed picture, there is a great probability of jumping out of the photographed picture, resulting in focus following failure.

Figure 5:
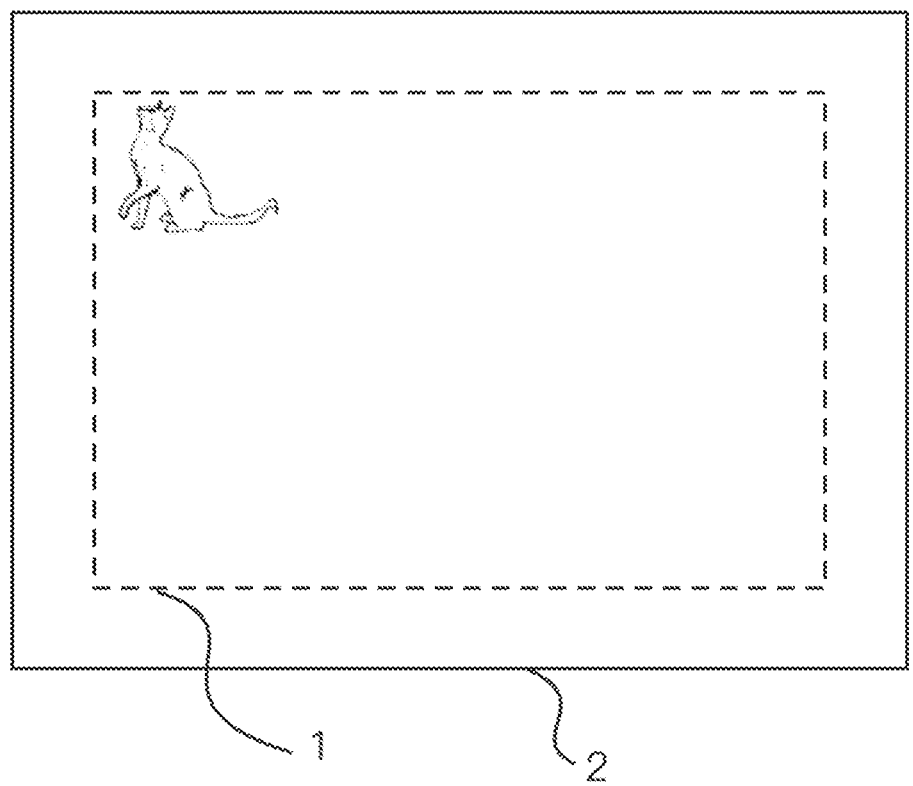
FIG. 5 is a schematic diagram of a photographing picture.

In this example, as shown in FIG. 5, solid-line frame 2 is a photographed picture frame, and dotted-line frame 1 is a preset undistorted area frame. In S6, the direction of the camera is adjusted when the distance from the coordinates of the motion gravity center image of the living object to the wide side of the photographed two-dimensional image is <1/7D, where D is the length of the long side of the photographed two-dimensional image. When the distance from the coordinates of the motion gravity center image of the living object to the long side of the photographed two-dimensional image is <1/7F, the directionality of the camera is adjusted, where F is the length of the wide side of the photographed two-dimensional image, and the length of the long side is not lower than the length of the wide side. In the present disclosure, whether the living object is at the edge of the photographed picture is detected, and if the living object is at the edge of the photographed picture, the direction of the camera is adjusted such that the living object is located in the non-edge area of the picture, thereby ensuring the authenticity of the photographed picture and continuous focus following.

Example 9

A readable storage medium includes
an executable program, where the executable program can execute the focus following method based on a motion gravity center.

A photographing system based on a motion gravity center includes
- an imaging module,
- a storage module, and
- a processing module, where
  - the imaging module is configured to acquire image information,
  - the storage module is configured to store the image information and an executable program, and
  - the processing module can execute the focus following method based on a motion gravity center when operating the executable program.

Figure 6:
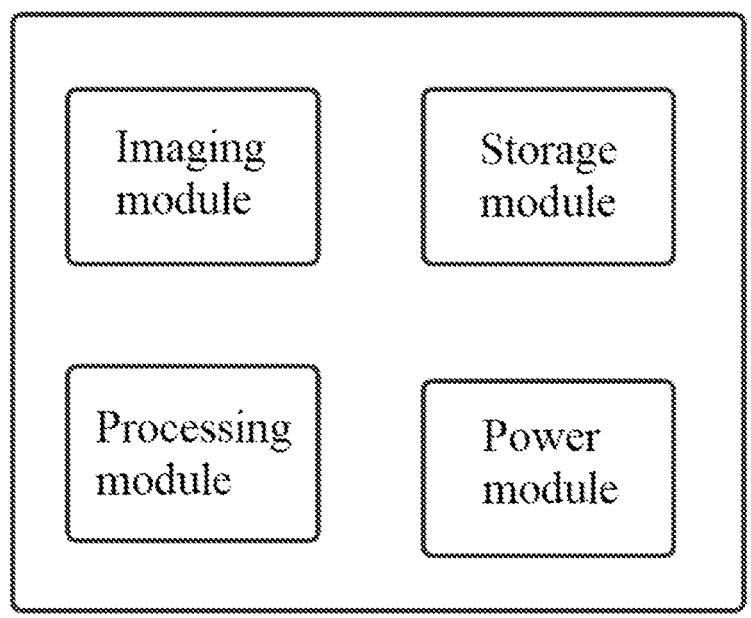
FIG. 6 is a frame diagram of a photographing system.

In this example, as shown in FIG. 6, the photographing system based on a motion gravity center includes the imaging module, the storage module, and
- the processing module, where the imaging module is configured to acquire image information, the storage module is configured to store the image information and the focus following system based on a motion gravity center, and the processing module can execute the focus following system based on a motion gravity center. The processing module can receive signals from a motion gravity center library of a cloud and send local video data to the cloud. In one example, there is a power supply, which is configured to provide power for photographing.

In the description of the examples of the present disclosure, it needs to be understood the orientation or positional relationships indicated by the terms "up", "down", "front", "rear", "left", "right", "vertical", "horizontal", "center", "top", "bottom", "top portion", "bottom portion", "inside", "outside", "inner side", "outer side", etc.

In the description of the examples of the present disclosure, it should be noted that, unless otherwise explicitly specified and defined, the terms "mounting", "connecting", "connection" and "assembling" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

In the description of the examples of the present disclosure, the specific features, structures, materials or characteristics described may be combined in any one or more examples or instances in a suitable manner.

In the description of the examples of the present disclosure, it should be understood that "-" and "~" represent the range of two values, and the range includes endpoints. For example, "A-B" represents a range greater than or equal to A and less than or equal to B. "A~B" represents a range greater than or equal to A and less than or equal to B.

In the description of the examples of the present disclosure, the term "and/or", which is merely an association relation describing an associated object, means that there may be three relations, for example, A and/or B may represent three situations: A exists alone, A and B exist at the same time, and B exists alone. In addition, the character "/" in the description generally represents that successive association objects are in an "or" relation.

Although the examples of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. A focus following method based on a motion gravity center, comprising the following steps:
    S1, acquiring video data captured by a camera within an initial time period;
    S2, acquiring video data with only a living object within the initial time period;
    S3, acquiring a motion gravity center image from the video data with only the living object according to a motion gravity center library;
    S4, calculating an initial motion direction and an initial motion speed of the motion gravity center image within the initial time period;
    S5, calculating a motion trajectory of the living object according to data in S4; and
    S6, calculating a corresponding function relationship between the motion trajectory of the living object and a focus following, wherein
    S3 comprises the following substeps:
    S31, establishing the motion gravity center library;
    S32, acquiring original data about the living object leaving a ground and only being stressed, wherein the original data has video data and image data;
    S33, acquiring a reference video image with only the living object from the original data;
    S34, acquiring a relative speed of a local body of the living object at a first moment from the reference video image;
    S35, fitting the relative speed of the local body at the first moment in a horizontal direction, and calculating an average speed of the living object in the horizontal direction;
    S36, acquiring a two-dimensional image block same as the average speed from the reference video image, wherein coordinates where the two-dimensional image block is located are coordinates of the motion gravity center image; and
    S37, storing the two-dimensional image block into the motion gravity center library.

2. The focus following method based on the motion gravity center according to claim 1, wherein
    the average speed of the living object in the horizontal direction is $$V=F(v1,v2,\ldots,vm) \quad (1),$$

the local body has a head, eyes, forepaws, and hind paws,
    $v1, v2, \ldots, vm$ represent speeds of various portions of the local body respectively at the first moment in the horizontal direction, m is an integer greater than 1, and
    F ( ) represents a fitting function of the average speed.

3. The focus following method based on the motion gravity center according to claim 2, wherein
    each frame of an image in the video data with only the living object is divided into a motion gravity center area and a non-motion gravity center area,
    the motion gravity center image is acquired from the motion gravity center area according to the motion gravity center library,
    the motion gravity center area has a back image and an abdomen image of the living object, and the non-motion gravity center area has a head image, a leg image, and a tail image of the living object.

4. The focus following method based on the motion gravity center according to claim 3, wherein each frame of the image in the video data with only the living object is divided into a nine-grid area of 3*3, and the motion gravity center area is located in a second column and a second row of the nine-grid area.

5. The focus following method based on the motion gravity center according to claim 4, wherein in S4,
the initial motion direction has a plane moving direction and a depth moving direction,
the plane moving direction is a motion direction of the living object on a photographed two-dimensional image, and the depth moving direction is a motion direction of the living object in a direction perpendicular to a photographed two-dimensional plane.

6. The focus following method based on the motion gravity center according to claim 5, wherein
the initial motion speed has a plane moving speed and a depth moving speed,
the plane moving speed is a motion speed of the living object on the photographed two-dimensional image, the depth moving speed is a motion speed of the living object in the direction perpendicular to the photographed two-dimensional plane, and
the initial motion speed is a sum speed of the plane moving speed and the depth moving speed.

7. The focus following method based on the motion gravity center according to claim 6, wherein
a direction of the depth moving speed of the living object is calculated by calculating a change proportion of a size of the motion gravity center image within the initial time period, moreover,
if the size of the motion gravity center image becomes larger within the initial time period, it is indicated that the living object moves in a direction close to the camera,
if the size of the motion gravity center image within the initial time period is unchanged, it is indicated that a distance between the living object and the camera is unchanged, and
if the size of the motion gravity center image becomes smaller within the initial time period, it is indicated that the living object moves in a direction away from the camera.

8. The focus following method based on the motion gravity center according to claim 6, wherein
a direction of the depth moving speed of the living object is calculated by calculating a change in a shape of a hair spot in the motion gravity center image within the initial time period.

9. The focus following method based on the motion gravity center according to claim 1, wherein in S6,
a direction of the camera is adjusted when a distance from the coordinates of the motion gravity center image of the living object to a wide side of a photographed two-dimensional image is <D/7, D is a length of a long side of the photographed two-dimensional image,
when a distance from the coordinates of the motion gravity center image of the living object to a long side of the photographed two-dimensional image is <F/7, the direction of the camera is adjusted, F is a length of the wide side of the photographed two-dimensional image, and the length of the long side is not lower than the length of the wide side.

10. A non-transitory readable storage medium, comprising, an executable program, wherein the executable program executes the focus following method based on the motion gravity center according to claim 1.

11. The readable storage medium according to claim 10, wherein in the focus following method,
the average speed of the living object in the horizontal direction is $$V = F(v1, v2, \ldots, vm) \quad (1),$$

the local body has a head, eyes, forepaws, and hind paws,
v1, v2, ..., vm represent speeds of various portions of the local body respectively at the first moment in the horizontal direction, m is an integer greater than 1, and F ( ) represents a fitting function of the average speed.

12. The readable storage medium according to claim 11, wherein in the focus following method,
each frame of an image in the video data with only the living object is divided into a motion gravity center area and a non-motion gravity center area,
the motion gravity center image is acquired from the motion gravity center area according to the motion gravity center library,
the motion gravity center area has a back image and an abdomen image of the living object, and the non-motion gravity center area has a head image, a leg image, and a tail image of the living object.

13. The readable storage medium according to claim 12, wherein in the focus following method,
each frame of the image in the video data with only the living object is divided into a nine-grid area of 3*3, and the motion gravity center area is located in a second column and a second row of the nine-grid area.

14. The readable storage medium according to claim 13, wherein in S4 of the focus following method,
the initial motion direction has a plane moving direction and a depth moving direction,
the plane moving direction is a motion direction of the living object on a photographed two-dimensional image, and the depth moving direction is a motion direction of the living object in a direction perpendicular to a photographed two-dimensional plane.

15. The readable storage medium according to claim 14, wherein in the focus following method,
the initial motion speed has a plane moving speed and a depth moving speed,
the plane moving speed is a motion speed of the living object on the photographed two-dimensional image, the depth moving speed is a motion speed of the living object in the direction perpendicular to the photographed two-dimensional plane, and
the initial motion speed is a sum speed of the plane moving speed and the depth moving speed.

16. The readable storage medium according to claim 15, wherein in the focus following method,
a direction of the depth moving speed of the living object is calculated by calculating a change proportion of a size of the motion gravity center image within the initial time period, moreover,
if the size of the motion gravity center image becomes larger within the initial time period, it is indicated that the living object moves in a direction close to the camera,
if the size of the motion gravity center image within the initial time period is unchanged, it is indicated that a distance between the living object and the camera is unchanged, and
if the size of the motion gravity center image becomes smaller within the initial time period, it is indicated that the living object moves in a direction away from the camera.

17. The readable storage medium according to claim 15, wherein in the focus following method,
  a direction of the depth moving speed of the living object is calculated by calculating a change in a shape of a hair spot in the motion gravity center image within the initial time period.

18. The readable storage medium according to claim 10, wherein in S6 of the focus following method,
  a direction of the camera is adjusted when a distance from the coordinates of the motion gravity center image of the living object to a wide side of a photographed two-dimensional image is <D/7, D is a length of a long side of the photographed two-dimensional image,
  when a distance from the coordinates of the motion gravity center image of the living object to a long side of the photographed two-dimensional image is <F/7, the direction of the camera is adjusted, F is a length of the wide side of the photographed two-dimensional image, and the length of the long side is not lower than the length of the wide side.

19. A photographing system based on a motion gravity center, comprising,
  an imaging module,
  a storage module, and
  a processing module, wherein
  the imaging module is configured to acquire image information,
  the storage module is configured to store the image information and an executable program, and
  the processing module is configured to execute the focus following method based on the motion gravity center according to claim 1 when operating the executable program.

20. The photographing system based on the motion gravity center according to claim 19, wherein in the focus following method,
  the average speed of the living object in the horizontal direction is $$V = F(v1, v2, \ldots, vm) \tag{1},$$

the local body has a head, eyes, forepaws, and hind paws,
v1, v2, , vm represent speeds of various portions of the local body respectively at the first moment in the horizontal direction, m is an integer greater than 1, and
F ( ) represents a fitting function of the average speed.

* * * * *